US011987043B2

(12) United States Patent
Hamada

(10) Patent No.: US 11,987,043 B2
(45) Date of Patent: May 21, 2024

(54) PRINTING APPARATUS AND CONTROL METHOD CONTROLLING HEATING OF MEDIUM

(71) Applicant: CANON KABUSHIKI KAISHA, Tokyo (JP)

(72) Inventor: Takuya Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/902,351

(22) Filed: Sep. 2, 2022

(65) Prior Publication Data

US 2023/0166532 A1 Jun. 1, 2023

Related U.S. Application Data

(63) Continuation of application No. 16/990,722, filed on Aug. 11, 2020, now Pat. No. 11,446,936.

(30) Foreign Application Priority Data

Aug. 27, 2019 (JP) ................................ 2019-154973

(51) Int. Cl.
*B41J 11/00* (2006.01)
*B41J 3/60* (2006.01)
(Continued)

(52) U.S. Cl.
CPC ............... *B41J 11/002* (2013.01); *B41J 3/60* (2013.01); *B41J 11/00222* (2021.01);
(Continued)

(58) Field of Classification Search
CPC ...... B41J 11/002; B41J 3/60; B41J 11/00222; B41J 11/00224; B41J 11/0024;
(Continued)

(56) References Cited

U.S. PATENT DOCUMENTS

| | | | |
|---|---|---|---|
| 8,911,050 | B2 | 12/2014 | Nishihara |
| 10,201,985 | B2 | 2/2019 | Jang et al. |

(Continued)

FOREIGN PATENT DOCUMENTS

| | | |
|---|---|---|
| JP | 2012-139820 A | 7/2012 |
| JP | 2013-103480 A | 5/2013 |

(Continued)

OTHER PUBLICATIONS

Office Action dated Jun. 12, 2023, in Japanese Application No. 2019-154973.

(Continued)

*Primary Examiner* — Henok D Legesse
(74) *Attorney, Agent, or Firm* — Venable LLP

(57) ABSTRACT

A printing apparatus includes a conveyance unit configured to convey a sheet along a conveyance path, a printing unit configured to print an image by discharging ink to the sheet conveyed by the conveyance unit, a heating unit configured to, in a heating section on the conveyance path, heat the sheet on which the image has been printed by the printing unit, and a control unit configured to control the heating unit so that the heating section is changed in accordance with a print condition.

10 Claims, 13 Drawing Sheets

(51) Int. Cl.
*B41J 13/00* (2006.01)
*B41J 13/03* (2006.01)

(52) U.S. Cl.
CPC ...... *B41J 11/00224* (2021.01); *B41J 11/0024* (2021.01); *B41J 13/0027* (2013.01); *B41J 13/0045* (2013.01); *B41J 13/009* (2013.01); *B41J 13/03* (2013.01); *B41J 2202/20* (2013.01)

(58) Field of Classification Search
CPC .. B41J 13/0027; B41J 13/0045; B41J 13/009; B41J 13/03; B41J 2202/20
See application file for complete search history.

(56) References Cited

U.S. PATENT DOCUMENTS

2004/0189773 A1* 9/2004 Masumi ............ B41J 11/00242 347/102
2011/0267393 A1* 11/2011 Okamoto ............ B41J 11/0024 347/61
2012/0013671 A1 1/2012 Houjou
2013/0100198 A1 4/2013 Kanome et al.
2014/0009546 A1* 1/2014 Velasco ................. B41J 29/377 347/102
2014/0092162 A1 4/2014 Nishihara
2014/0232797 A1* 8/2014 Onodera .............. B41J 11/0024 347/102
2014/0354728 A1 12/2014 Murata et al.
2018/0050548 A1 2/2018 Zuza Irurueta et al.
2018/0339528 A1 11/2018 Ueda et al.
2019/0193426 A1 6/2019 Mizushima et al.
2021/0060976 A1 3/2021 Hamada
2021/0070068 A1 3/2021 Hamada

FOREIGN PATENT DOCUMENTS

JP 2013-215982 A 10/2013
JP 2014-080011 A 5/2014
JP 2015-205476 A 11/2015
JP 2018-199546 A 12/2018
JP 2019-116055 A 7/2019
JP 2019-142085 A 8/2019

OTHER PUBLICATIONS

Extended European Search Report dated Jan. 22, 2021, in European Patent Application No. 20186636.5.

* cited by examiner

PRINTING APPARATUS AND CONTROL METHOD CONTROLLING HEATING OF MEDIUM

BACKGROUND OF THE INVENTION

Field of the Invention

The present disclosure is related to a printing technique.

Description of the Related Art

In methods in which ink is discharged to a sheet to thereby print an image, there are cases in which the sheet curls due to moisture included in the ink. Accordingly, techniques for heating the sheet to accelerate drying have been proposed. For example, a technique in which drying is accelerated by blowing hot air onto a sheet on which an image has been printed is disclosed in the specification of U.S. Pat. No. 10,201,985.

The form of heating that is suitable to drying a sheet may differ depending on print conditions. For example, when the sheet conveyance path differs depending on one-side printing and double-side printing, if a sheet is heated in the same section on the conveyance path in both cases, the sheet may be heated unnecessarily or unsuitably. There are cases in which this results in an excess or deficiency in the drying of the sheet, or results in the internal temperature of the apparatus rising unnecessarily or in unnecessary power consumption.

SUMMARY OF THE INVENTION

The present invention provides a technique capable of controlling heating of a sheet in accordance with a print condition.

According to an aspect of the present invention, there is provided a printing apparatus, comprising: a conveyance unit configured to convey a sheet along a conveyance path; a printing unit configured to print an image by discharging ink to the sheet conveyed by the conveyance unit; a first heating unit configured to, in a heating section on the conveyance path, heat the sheet on which the image has been printed by the printing unit; and a control unit configured to control the first heating unit so that the heating section is changed in accordance with a print condition.

Further features of the present invention will become apparent from the following description of exemplary embodiments (with reference to the attached drawings).

DESCRIPTION OF THE EMBODIMENTS

Figure 1:
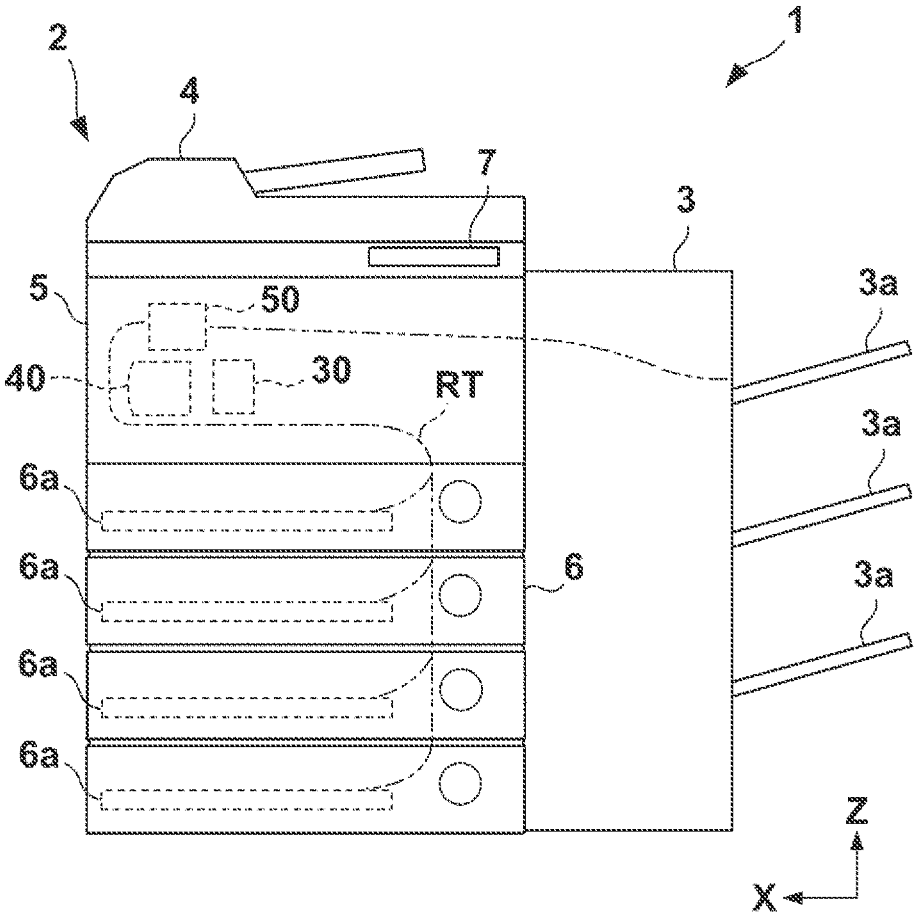
FIG. 1 is a front surface view of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Printing System Configuration>

FIG. 1 is a front surface view of a printing system 1 according to an embodiment of the present invention. An arrow X in each figure including FIG. 1 indicates left and right directions, and an arrow Y indicates the depth direction, and these are orthogonal to each other. An arrow Z indicates a vertical direction.

The printing system 1 includes an apparatus main body 2 and a post-processing apparatus 3. The apparatus main body 2 of the present embodiment is an apparatus that configures a multi-function device, and the apparatus main body 2 comprises a copy function, a scanner function, and a printer function. The apparatus main body 2 includes a reading apparatus 4, a printing apparatus 5, and a feeding apparatus 6, and an operation unit 7 is provided on a front portion of the apparatus main body 2. The operation unit 7 is a user input/output interface, and, for example, includes hard keys, a display unit, or a touch panel that receives user input and displays information, and includes an output unit such as a voice generator.

The reading apparatus 4 includes an ADF (automatic document feeder) and the reading apparatus 4 conveys stacked originals and reads original images. The feeding apparatus 6 is an apparatus for feeding a recording medium to the printing apparatus 5. The recording medium, in the case of the present embodiment, is a sheet of paper or film or the like, and in particular is a cut sheet. There are cases where the recording medium is referred to as a sheet. The feeding apparatus 6 includes a plurality of cassettes **6*a* on which sheets are stacked, and a feeding mechanism (not shown) for feeding sheets from the cassettes 6*a* to the printing apparatus 5** on a conveyance path RT.

The printing apparatus 5 prints an image on a sheet. The printing apparatus 5 includes a printing unit 30 for printing an image by discharging ink onto a sheet and drying acceleration units 40 and 50 for accelerating drying of sheets. Details of the printing apparatus 5 will be described later.

The post-processing apparatus 3 is attached disconnectably to a side of the apparatus main body 2 as an optional apparatus, and is a finisher (sheet processing apparatus) for performing sheet post-processing. The post-processing may be, for example, stacking processing in which sheets discharged from the printing apparatus 5 are stacked on a tray 3*a*, sorting processing in which a plurality of sheets discharged from the printing apparatus 5 are read in order and aligned in a bundle form, stapling processing in which a bundled sheet bundle is bound by a stapler, binding processing, or punch press processing.

Printing Apparatus Configuration

Figure 2:
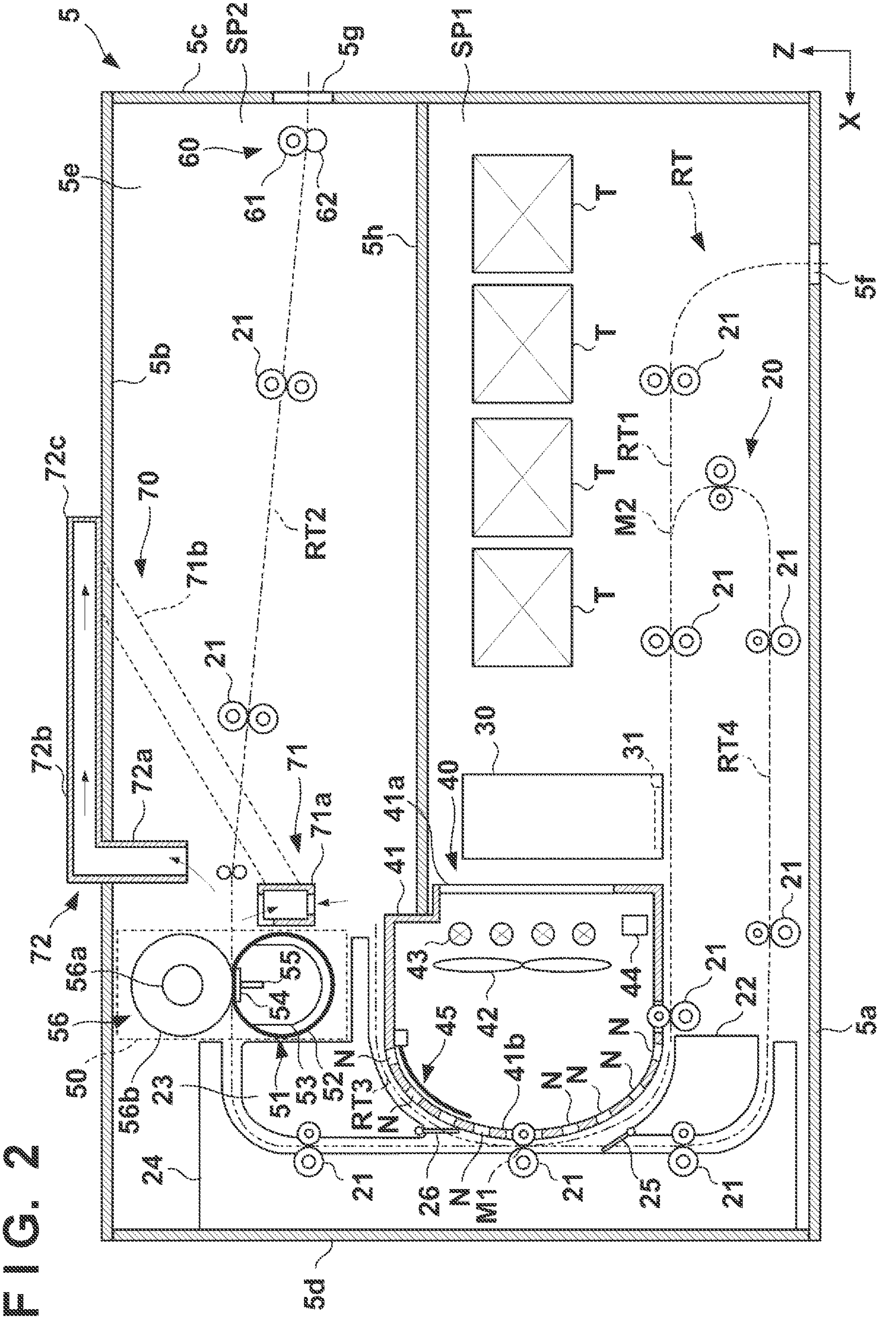
FIG. 2 is a schematic view of a printing apparatus.

FIG. 2 is an explanatory view illustrating an internal structure of the printing apparatus 5. The printing apparatus 5 includes, as frames for supporting internal mechanisms, a bottom wall portion 5*a*, a top wall portion 5*b*, a right wall portion 5*c*, a left wall portion 5*d*, and a back wall portion 5*e*. These walls define the internal space of the printing apparatus 5. The internal space of the printing apparatus 5 is further separated into a bottom space SP1 and a top space SP2 by a partition wall 5*h*. The space SP1 and the space SP2 are not divided hermetically, and communicate with each other.

The bottom wall portion 5*a* has an opening 5*f* through which a sheet that is fed from the feeding apparatus 6 passes. The right wall portion 5*c* has an opening 5*g* through which a sheet that is discharged to the post-processing apparatus 3 passes. The left wall portion 5*d* and the right wall portion 5*c* may be supported so as to be able to open/close, in the form of a door, for maintenance.

The printing apparatus 5 includes a conveyance unit 20, the printing unit 30, the drying acceleration units 40 and 50, a straightening unit 60, and an exhaust unit 70.

Conveyance Unit

The conveyance unit 20 is a mechanism for conveying a sheet along a conveyance path RT. The conveyance path RT is a path along which sheets are conveyed whose upstream end is the opening 5*f* and whose downstream end is the opening 5*g* in the case of the present embodiment. The conveyance path RT includes main paths RT1 and RT2, a redirecting path RT3, and an inversion path RT4. The main paths RT1 and RT2 are paths that connect the opening 5*f* to the opening 5*g* through a midpoint M1, and the main path RT1 is from the opening 5*f* to the midpoint M1 and the main path RT2 is from the midpoint M1 to the opening 5*g*. The main paths RT1 and RT2 are paths for conveying a sheet leftward and then upward and then rightward, and the sheet passes, in order, through the printing unit 30, then the drying acceleration unit 40, then the drying acceleration unit 50, and then the straightening unit 60. In the case of one-side printing, in which only one side of the sheet is printed on, the sheet is conveyed through the main paths RT1 and RT2.

The redirecting path RT3 and the inversion path RT4 are paths that are formed to branch from the main path RT1, and along which a sheet is conveyed after one-side printing in the case of double-side printing in which both sides of the sheet are printed on. The redirecting path RT3, from the midpoint M1, forms a path separate from the main path RT2. Also, the inversion path RT4 is a path from the midpoint M1 to a merging point M2 part way through the main path RT1, and, via the inversion path RT4, the front and back of a sheet are inverted and the sheet is returned once again to the main path RT1.

When the downstream side and the upstream side are referred to in the discussion below, the conveyance direction of the sheet in the conveyance path RT is the reference.

The conveyance unit 20 includes a driving mechanism that biases a conveying force in relation to a sheet, and a guide that guides the conveyance of the sheet along the conveyance path RT, and part of that is illustrated in FIG. 2. The driving mechanism includes a plurality of conveyance rollers 21 which are driven by a driving source such as a motor. A driven roller or spur is arranged to face each of the conveyance rollers 21. A sheet is conveyed so as to be sandwiched between the conveyance roller 21 and the driven roller or spur. The spur, in order to maintain the quality of a printed image, is arranged so as to contact the side of the printing surface in a region on the downstream side of the printing unit 30. The guide includes guide members 22 to 24. The guide member 24 is supported by the left wall portion 5*d*. Part of the conveyance path RT is formed between the guide member 23 and the guide member 24, and part of the path RT1 is formed between the guide member 22 and the guide member 24.

The conveyance unit 20 includes path switching units 25 and 26. The path switching units 25 and 26 are units for switching the sheet guidance path, and operate by a driving source such as an electromagnetic solenoid, a motor, or the like. The path switching units 25 and 26 guide the sheet from the main path RT1 to the main path RT2 in the case of one-side printing and, in the case of double-side printing, guide the sheet from the main path RT1 to the redirecting path RT3, and then guide the redirected sheet to the inversion path RT4. FIG. 3 illustrates path switching states of the path switching units 25 and 26. The path switching units 25 and 26 respectively include pivotable flaps, and switch the path by positioning of the flaps. The positioning illustrated in solid lines is the positioning in the case of one-side printing, and the positioning illustrated in dashed lines is the positioning in a case of double-side printing. Sheet sensors for detecting the presence or absence of a sheet at respective locations on the conveyance path RT are arranged, and the position of the sheet on the conveyance path RT is identified by sheet sensor detection results.

Printing Unit

Returning to FIG. 2, the printing unit 30 includes a printhead 31, and the printhead 31 is an inkjet head for forming images (ink images) by discharging ink onto a sheet. The ink that the printhead 31 discharges is contained in a plurality of ink tank units T. The ink tank units T are arranged for each type of ink, and the types of ink are, for example, yellow, magenta, cyan, and black color types.

The printhead 31 is arranged for each type of ink. In the case of the present embodiment, each printhead 31 is a full-line head arranged to extend in a Y direction, and nozzles are arranged in a range covering a width of an image printing area of a sheet of a maximum size that can be used. A printhead includes a bottom surface that faces the sheet via a minute gap (of several mm, for example), and an ink discharge surface in which a nozzle is open is formed in this bottom surface.

A discharging element is arranged in each nozzle. The discharging element is, for example, an element that causes pressure to form within the nozzle to discharge ink within the nozzle, and a publicly known inkjet head technique can be applied thereto. The discharging element may be, for example, an element that discharges ink by forming air bubbles by causing film boiling to occur in the ink by an electrothermal transducer, an element that discharges ink by an electromechanical transducer, an element that discharges ink using static electricity, or the like. It is possible to perform high-density printing at high-speed by using a discharging element that uses an electrothermal transducer.

Note that the printing unit 30 may be a serial printing unit in which printing is performed by the reciprocal movement of a printhead arranged on a carriage in a sheet width direction. Also, the ink to be discharged may be of a single type such as when it is only black. It is possible to select a single ink printing mode and a multiple ink type printing mode as the printing mode of the printing unit 30. The ink may mainly contain a coloring agent (a dye or a pigment) and a solvent component. A water-based material or an oil-based material may be used for the solvent component. As the dye, a water-soluble dye as typified by, for example, a direct dye, an acidic dye, a basic dye, a reactive dye, a food dye, or the like, is preferable, and the dye may be anything that provides an image that satisfies a fixing characteristic, colorability, vividness, stability, lightfastness, or other desired characteristics in combination with the above-described recording medium. A carbon black or the like is preferable for the pigment. A method for using a pigment and a dispersing agent together may be a method using self dispersion pigment or a method of microencapsulation. Also, for the ink, it is possible to add various additives, as necessary, such as a solvent component, a solubilizer, a viscosity modifier, a surfactant, a surface tension adjuster, a pH adjuster, a resistivity adjusting agent, and the like. Also, rather than arranging the printhead 31 for every type of ink, nozzles may be arranged for every type of ink on a single printhead.

Drying Acceleration Unit

A sheet, after an image has been printed thereon by the printing unit 30, may expand due to the liquid in the ink and an undulation may form therein. Such a sheet may become the cause of a paper jam in the printing apparatus 5 or of a deterioration in stacking performance/alignment performance in the post-processing apparatus 3. By accelerating sheet drying, it is possible to prevent the expansion of the sheet due to liquid in the ink. The printing apparatus 5 of the present embodiment comprises a plurality of drying acceleration units 40 and 50 that are similar in that they heat the sheet, but whose methods of drying the sheet differ. Note that a predetermined moisture is included in the liquid of the ink.

The drying acceleration unit 40 is a unit that is arranged on the downstream side of the printing unit 30 and that heats the sheet by blowing hot air onto the sheet in a predetermined heating section on the conveyance path RT, thereby accelerating drying of the sheet without contacting the sheet. This structure will be described with reference to FIG. 2, FIG. 3A, and FIG. 3B.

The drying acceleration unit 40 includes a hollow body 41 that defines an internal space and a fan 42 and a heating element 43 arranged within the hollow body 41. The hollow body 41 comprises an air intake port 41*a* on a right side. The wall 41*b* that forms the left side of the hollow body 41 is a guide wall portion that is also used as a sheet conveyance guide, and the wall 41*b* extends in a Y direction so as to cover the width of the maximum size sheet. A guide wall portion 41*b* has C-shaped cross-sectional shape (cross-section on the X-Z plane), and has a wall surface that faces the guide members 22 to 24. Between this wall and the guide members 22 to 24, a part of the conveyance path RT is formed and the midpoint M1 is present at that part of the conveyance path RT. A large number of hot air outlets N that communicate with the internal space of the hollow body 41 are formed in the guide wall portion 41*b*.

The fan 42 is an electrically driven fan for which a motor is made to be a driving source, and the fan 42 is, for example, a sirocco fan. The fan 42 introduces air into the hollow body 41 from the intake port 41*a*. The air pressure within the hollow body 41 increases due to the introduced air, and the air within the hollow body 41 is blown out of the hollow body 41 from the outlets N. There may be one fan 42 or there may be a plurality of fans 42 arranged adjacently in a Y direction.

The heating element 43 heats the air introduced into the hollow body 41 from the intake port 41*a* by the fan 42. In the case of the present embodiment, the heating element 43 is a rod-like heating element such as an infrared light lamp heater or the like, and the heating element 43 extends in the Y direction. Also, a plurality of heating 43 elements are arranged in a Z direction. The plurality of the heating element 43 are arranged between the fan 42 and the intake port 41*a*, and the air introduced within the hollow body 41 from the intake port 41*a* is heated when passing through the heating element 43. A temperature sensor 44 is provided in the drying acceleration unit 40, and driving of the heating element 43 is controlled according to a result of detection by the temperature sensor 44.

By such a configuration, the drying acceleration unit 40 blows hot air from the outlets N whose air flow is indicated by the arrows in FIG. 3. By this, the sheet that passes through the conveyance path RT is heated to promote evaporation of the liquid included in the ink image on the sheet, and thereby drying of the sheet can be accelerated.

In the drying acceleration unit 40, a shutter unit 45 that changes the outlets N that blow out hot air is arranged. It is possible to change the heating section on the conveyance path by changing the outlets N that blow out hot air.

Figure 3A:
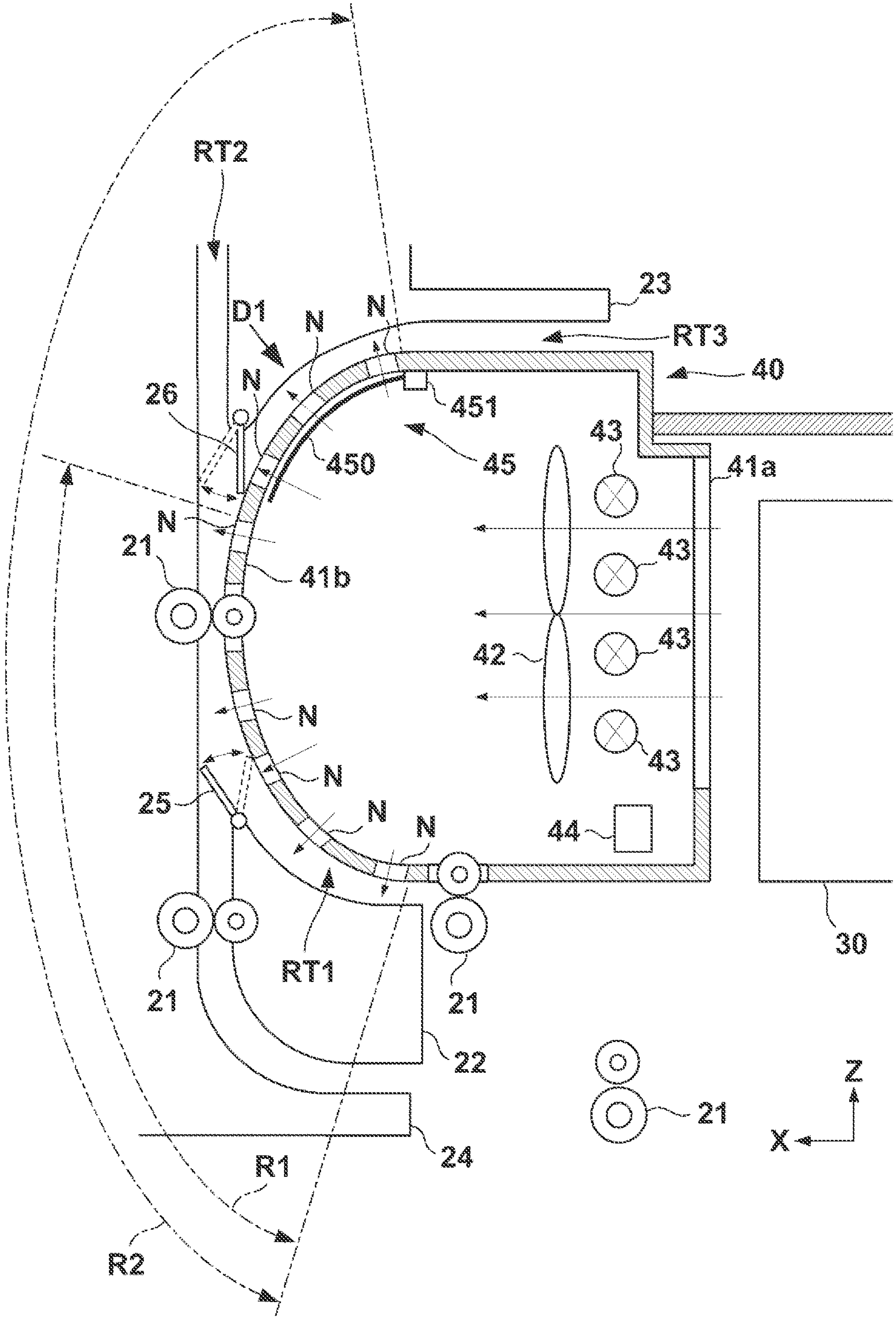
FIG. 3A is the explanatory view of a drying acceleration unit.

FIG. 3A is an explanatory view for the heating section. In the example of the figure, a heating section R1 and a heating section R2 are exemplified. The heating section R2 is all sections in which hot air can be blown out from the drying acceleration unit 40, and the heating section R1 is a part of the heating section R2. Accordingly, the heating section R2 is a section that is longer than the heating section R1. The heating section R2 includes a portion on the downstream side of the main path RT1 (from the starting point for blowing of hot air by the drying acceleration unit 40 until the midpoint M1) and a portion on the upstream side of the main path RT2 (the surrounding part of the midpoint M1) and the redirecting path RT3. The heating section R1 includes a portion on the downstream side of the main path RT1 (from the starting point for blowing hot air by the drying acceleration unit 40 until the midpoint M1) and the portion on the upstream side of the main path RT2 (the surrounding part of the midpoint M1).

Note that while in the present embodiment it is possible to change between two types of heating sections, there may be three or more types of heating sections that it is possible to change between. The three or more types of heating sections may have different lengths from each other, and a shorter heating section may be a portion of a larger heating section.

Figure 3B:
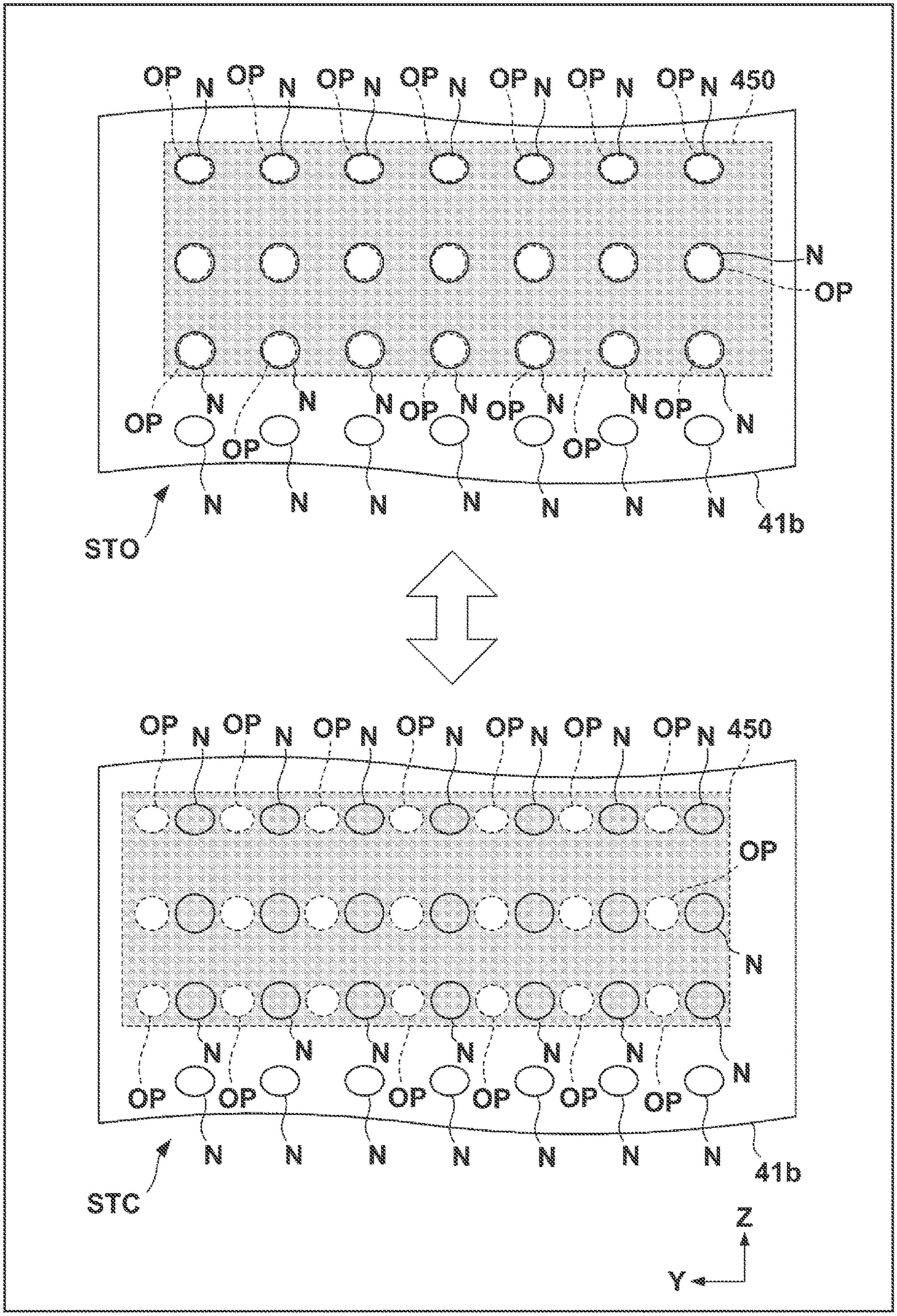
FIG. 3B is an explanatory view of a shutter unit.

The shutter unit 45 includes a shutter 450 and a drive unit 451 for reciprocally moving the shutter 450 in a Y direction. FIG. 3B is a view that illustrates movement states of the shutter 450, and shows a part of the wall 41*b* in a direction of an arrow D1 in FIG. 3A. The shutter 450 is arranged on the inner side of the wall 41*b*, and is a plate-like member having a form that follows the inner surface of the wall 41*b*. The shutter 450 has a size that overlaps only a part of the top side of the wall 41*b*, and its width (the width in the Y direction) reaches the entirety of the region in which the outlets N are formed on the wall 41*b*. In FIG. 3B, a pattern is added to the shutter 450 positioned in the background of the wall 41*b* so that the shutter 450 can be easily visually distinguished. The shutter 450 has a plurality of holes OP corresponding to the plurality of outlets N provided on the wall 41*b*. There is no pattern added for the holes OP.

The drive unit 451 is a driving mechanism such as a pull solenoid or an electrically-driven cylinder/ball screw mechanism/rack pinion mechanism for which a motor is a driving source, and the drive unit 451 causes the shutter 450 to slide in the Y direction. In FIG. 3B, a state STO indicates a state in which the shutter 450 is positioned at an open position, and a state STC indicates a state in which the shutter 450 is positioned at a closed position. In a case where the shutter 450 is positioned in an open position, the holes OP overlap the respective outlets N, and so the outlets N are in an open state in which hot air can be blown therethrough. The heating section is then R2. In the case where the shutter 450 is positioned in the closed position, the respective outlets N do not overlap the holes OP but rather overlap the body portion of the shutter 450, and the outlets N are in a closed state in which the hot air substantially cannot be blown therethrough. The heating section is then R1. In this fashion, by changing the outlets N through which the hot air is blown, the heating section can be switched between R1 and R2.

The drying acceleration unit 50 is arranged on the downstream side of the drying acceleration unit 40, and is a heat fixing device for heating the sheet by contacting the sheet and thereby accelerating the drying. Its structure is described with reference to FIG. 2.

The drying acceleration unit 50 includes a heating member 51 and a roller 56, and these extend in a Y direction so as to cover the width of the sheet of the maximum size. The heating member 51 includes a support member 53 for supporting a heating element 54 which is a heat source. The heating element 54 is, for example, a ceramic heater, and extends in a Y direction. The temperature of the heating element 54 is detected by a temperature sensor 55 as typified by a thermistor, and driving of the heating element 54 is controlled based on detection results.

The support member 53 supports a film 52. The film 52 is configured in a cylindrical shape and extends in a Y direction. The film 52 is supported by the support member 53 so as to be able to freely rotate around the support member 53, and is interposed between the roller 56 and the heating element 54. The film 52, for example, is a single layered film or a multi-layered film whose thickness is 10 μm or more and 100 μm or less. In a case of a single layered film, the material may be PTFE, PFA, or FEP, for example. In the case of a multi-layered film, PTFE, PFA, FEP, or the like, for example, may be coated on a layer of polyimide, polyamide-imide, PEEK, PES, PPS, or the like, or a film of a layered structure to which a coating is applied may be used.

Note that the configuration of the heating member 51 is not limited to this structure, and, for example, configuration may be taken such that a structure comprising a heating element such as a halogen heater is comprised within a hollow metal core axis, and an elastic body such as silicone rubber is coated around the core axis.

The roller 56 is configured to coat the circumferential surface of the core metal 56*a* by the elastic body 56*b* which may be silicone rubber. The roller 56 is crimped to the heating member 51 with a predetermined pressing force, and a nipping portion is formed by the roller 56 and the heating member 51. The roller 56 rotates with a motor as its driving source, and the film 52 rotates together with the roller 56. By such a configuration, it is possible to heat the sheet while it is being conveyed in the nipping portion, and thereby promote drying of the sheet.

In the present embodiment, the sheet is dried in two stages by the drying acceleration units 40 and 50, but configuration may be such that only one of the drying acceleration units is arranged.

Straightening Unit

The straightening unit 60 is a mechanism for straightening the curvature ("curl" here) of the sheet. In the case of the present embodiment, the straightening unit 60 includes a large-diameter drive roller 61 and a small-diameter driven roller 62. The drive roller 61 is a roller in which the circumference of a core metal is coated by an elastic body such as silicone rubber. The driven roller 62 is a metal roller. The drive roller 61 and the driven roller 62 press against each other. When a sheet passes between the drive roller 61 and the driven roller 62, pressure is applied to the sheet by these rollers, and it is possible to straighten a curl in the sheet. The straightening unit 60 can add a straightening force in a direction of projection, upward, for example, in relation to the sheet. In such a case, it is possible to straighten a sheet having a convex curl downward by the straightening unit 60 so that the sheet has a flatter shape.

Exhaust Unit

The exhaust unit 70 is a unit for discharging air within the printing apparatus 5 to the outside of the apparatus. The printing apparatus 5 of the present embodiment comprises the drying acceleration units 40 and 50, and these increase the temperature within the apparatus. Also, these act to cause moisture in the ink to evaporate. In a case where printing is performed consecutively in relation to a large number of sheets, the humidity level within the apparatus may rise. A high humidity level may cause curving of sheets. Between the drying acceleration unit 50 and the opening 5*g*, the sheet conveyance distance is comparably long, and moreover, the sheet is conveyed within the upper space SP2 in which water vapor tends to be retained. There are cases in which sheets are exposed to a high humidity level environment in the space SP2. The humidity level within the apparatus can be lowered by discharging air within the space SP2 to the outside of the apparatus by the exhaust unit 70.

Figure 4:
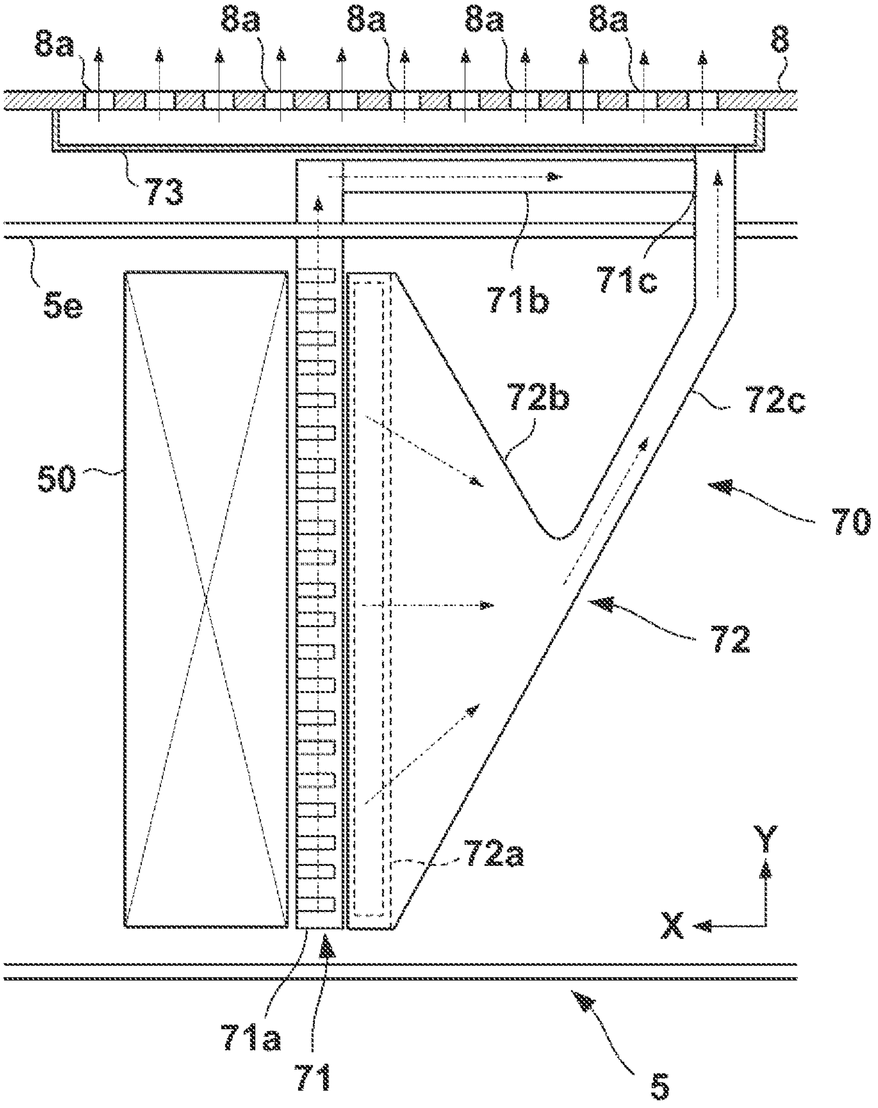
FIG. 4 is an explanatory view of an exhaust unit.

The exhaust unit 70 of the present embodiment is a structure that naturally discharges air within the space SP2 by the plurality of exhaust ducts 71 to 73. However, configuration may be taken such that the exhaust unit 70 forcibly discharges air within the apparatus by a fan or the like. With reference to FIG. 2 and FIG. 4, the structure of the exhaust unit 70 will be described. FIG. 4 is a plan view illustrating the vicinity of the exhaust unit 70, and the top wall portion 5*b* is omitted from the illustration.

An exhaust duct 71 is a tubular member including an extension 71*a* that extends in a Y direction and an extension 7*b* that extends from the end on the far side in the Y direction of the extension 71*a* to the right side in the X direction. The extension 71*a* extends at a position in the vicinity of the sheet discharge position in the drying acceleration unit 50 and below the main path RT2. The extension 71*a* is an air intake portion in which a plurality of slits for air intake ports are formed on the upper left-side and bottom. From the upper left-side slit, air that was warmed by the drying acceleration unit 50, for example, is introduced, and from the bottom slit, for example, it is possible for hot air blown out from the outlets N of the drying acceleration unit 40 to be introduced. The extension 71*a* is arranged to extend across the back wall portion 5*e*, and its end on the far side in the Y direction and the extension 7*b* are positioned outside (the far side in the Y direction) of the space SP2. Note that the extension 71*a* may be of a form that extends at a position on the top side of the main path RT2.

An exhaust duct 72 is a tubular member that includes an extension 72*a* that extends in the Y direction, a collection unit 72*b* that extends from the extension 72*a* to the right side, and an extension 72*c* that extends from the right end of the collection unit 72*b* to the far side of the Y direction. The extension 72*a* extends at a position in the vicinity of the sheet discharge position in the drying acceleration unit 50 and above the main path RT2. The bottom of the extension 72*a* opens to form an air intake port, and for example, air warmed by the drying acceleration unit 50 and water vapor in the space SP2 is introduced. The extension 72*a* crosses the top wall portion 5*b* and protrudes above the top wall portion 5*b*.

For the collection unit 72*b*, the extension 72*a* side in the plan view has a wide triangular shape, and its entirety is positioned above the top wall portion 5*b*. The collection unit 72*b* collects air introduced to the extension 72*a* in the center in the Y direction on the right end. The collected air flows to the extension 72*c*. The entirety of the extension 72*c* also is positioned above the top wall portion 5*b*, and partially warped and extends to the far side of the back wall portion 5*e*. In the far side of the back wall portion 5*e*, the extension 7*b* of the exhaust duct 71 is connected to the extension 72*c* of the exhaust duct 72, and these internal spaces communicate. The extension 72*c* is connected to an exhaust duct 73.

The exhaust duct 73 extends in the X direction and is an exhaust member open to the far side in the Y direction. The opening of the exhaust duct 73 faces a cover 8 that forms the exterior of the rear side of the apparatus main body 2. A large number of slits (louver) 8*a* are formed in the cover 8, and the air that has flowed into the exhaust duct 73 is discharged to the outside of the apparatus from the rear side of the apparatus main body 2 through the slits 8*a*.

Control Unit

Figure 5:
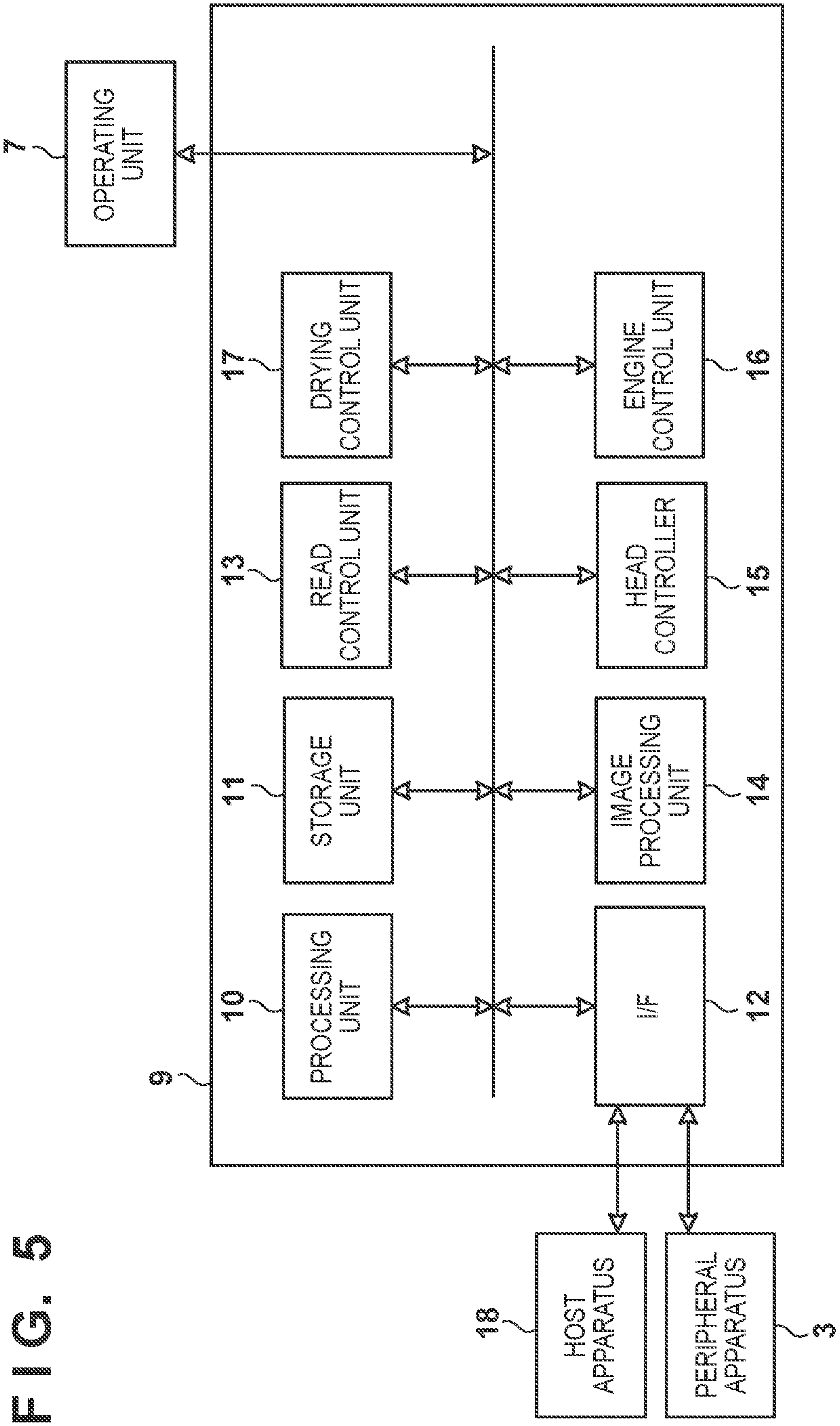
FIG. 5 is a block diagram of a control unit of an apparatus main body.

A control system of the apparatus main body 2 will be described. FIG. 5 is a block diagram of a control unit 9 of the apparatus main body 2. The control unit 9 comprises a processing unit 10, a storage unit 11, a read control unit 13, an image processing unit 14, a head controller 15, an engine control unit 16, and a drying control unit 17. The processing unit 10 is a processor as typified by a CPU (central processing unit), and comprehensively controls operation of each unit of the apparatus main body 2. The storage unit 11 is a storage device such as a ROM or a RAM, for example. In the storage unit 11, programs for the processing unit 10 to execute and fixed data (for example, data related to the type of sheets stored in each cassette 6*a*) necessary for various operations of the apparatus main body 2 are stored. Also, the storage unit 11 stores various setting data in a work area for the processing unit 10 or a temporary storage region for various received data.

The read control unit 13 controls the reading apparatus 4. The image processing unit 14 performs image processing for image data that the apparatus main body 2 handles. The inputted image data color space (for example, YCbCr) is converted into a standard RGB color space (for example, sRGB). The print data obtained by such image processing is stored in the storage unit 11. The head controller 15 performs control for driving the printing unit 30 in accordance with print data based on control commands received from the processing unit 10. The engine control unit 16 performs sheet conveyance control and the like. The drying control unit 17 performs control for driving the drying acceleration units 40 and 50. Each of these control units includes a processor such as a CPU, a storage device such as a RAM or a ROM, and an interface for an external device.

An I/O 12 is an interface (I/F) for connecting the control unit 9 with a host apparatus 18 and the post-processing apparatus 3, and is a local I/F or a network I/F. The host apparatus 18 is an apparatus that is an image data supply source for causing the printing apparatus 5 to perform a printing operation. The host apparatus 18 may be a general-purpose or dedicated computer, and may be a dedicated image device such as an image capturing device having an image reader unit, a digital camera, or a photo storage.

Control to Change Heating Section

The redirecting path RT3 included in the heating section R2 is a path over which sheets are conveyed in the case of double-side printing, and a path over which sheets are not conveyed in the case of one-side printing. Assuming that the heating section of the drying acceleration unit 40 is uniformly made to be the heating section R2, in a case where one-side printing over which a sheet is not conveyed to the redirecting path RT3, hot air that does not contribute to the drying of the sheet is blown to the redirecting path RT3. This is a waste (a waste of power consumption) of the heat generated by the heating element 43. Also, in the case of the present embodiment, since the redirecting path RT3 does not communicate with the space SP2, hot air blown to the redirecting path RT3 flows to the space SP2. The hot air that does not contribute (by which heat exchange with the moisture does not occur) to the drying of the sheet causes an unnecessary rise in the temperature of the space SP2. Cases are envisioned where, when the temperature of the space SP2 rises, another sheet that is conveyed via the drying acceleration unit 50 towards the straightening unit 60 will be heated, and the intended curvature of the other sheet will not be achieved by the straightening unit 60.

Conversely, assuming that the heating section of the drying acceleration unit 40 is uniformly made to be the heating section R1, in the case of double-side printing in which a sheet is conveyed to the redirecting path RT3, it is envisioned that there will be cases where drying of the sheet will be insufficient.

Figure 10A:
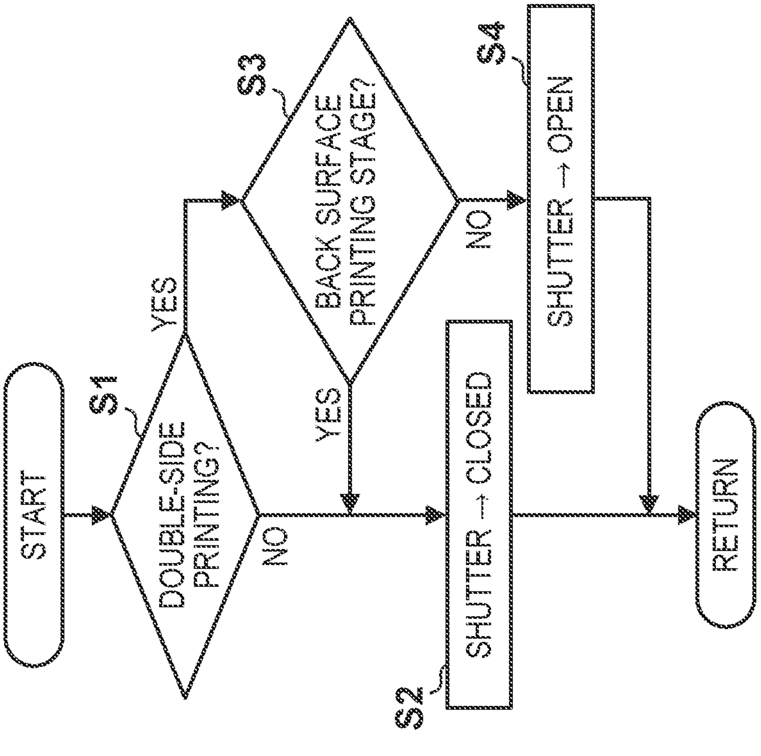
FIG. 10A and FIG. 10B are flowcharts for illustrating a control example.

Accordingly, in the present embodiment, the heating section is changed depending on one of the sheet print conditions, namely one-side printing or double-side printing. In other words, in the plurality of conveyance paths, the heating section is changed in accordance with the current sheet conveyance path. By this, it is possible to control heating of the sheet in accordance with the print condition, and it is possible to achieve drying of the sheet as intended. FIG. 10A is a flowchart that illustrates an example of control for changing the heating section. Processing of FIG. 10A is a process for controlling the drying acceleration unit 40 that is executed by the drying control unit 17, for example.

In step S1, it is determined whether a print condition for an image on a sheet that is the current print target is one-side printing or double-side printing. In the case of one-side printing, the processing advances to step S2, and in the case of double-side printing, the processing advances to step S3. In step S2, the drive unit 451 is driven, and the shutter 450 is positioned at a closed position. The heating section R1 ends up being selected. In step S3, it is determined whether printing of an image on a front surface (hereinafter a first surface), on which an image is printed first among front/back surfaces of the sheet that is the current target of printing, has completed, and it is the stage in which an image is to be printed on the back surface (hereinafter, second surface).

If it is the stage in which the image is to be printed on the second surface, the processing advances to step S2, and the shutter 450 is positioned in the closed position. The heating section R1 becomes selected. If it is not the stage in which the image is to be printed on the second surface, and rather it is the stage in which an image is to be printed on the first surface, the processing advances to step S4. In step S4, the drive unit 451 is driven and the shutter 450 is thereby positioned in the open position. The heating section R2 becomes selected. The above processing is repeated, and the heating section is changed according to whether it is one-side printing or double-side printing. In the case of the double-side printing, the heating section is also changed according to whether it is the stage for printing the first surface or it is the stage for printing the second surface.

Operation Example

An example of a printing operation by the printing apparatus 5 according to control by the control unit 9 will be described with reference to FIG. 6 to FIG. 9. First, with reference to FIG. 6 and FIG. 7, operation in a case where an image is printed on one side of a sheet will be described. In a case of printing an image on one side of a sheet, the path switching units 25 and 26 are set at the positions for the case of the one-side printing (the positioning illustrated in solid lines in FIG. 3A). By the processing of FIG. 10A, the shutter 450 is positioned in the closed position and the heating section R1 is set. The heating element 43 of the drying acceleration unit 40 and the heating element 54 of the drying acceleration unit 50 may be kept at a temperature that is predetermined in advance.

Figure 6:
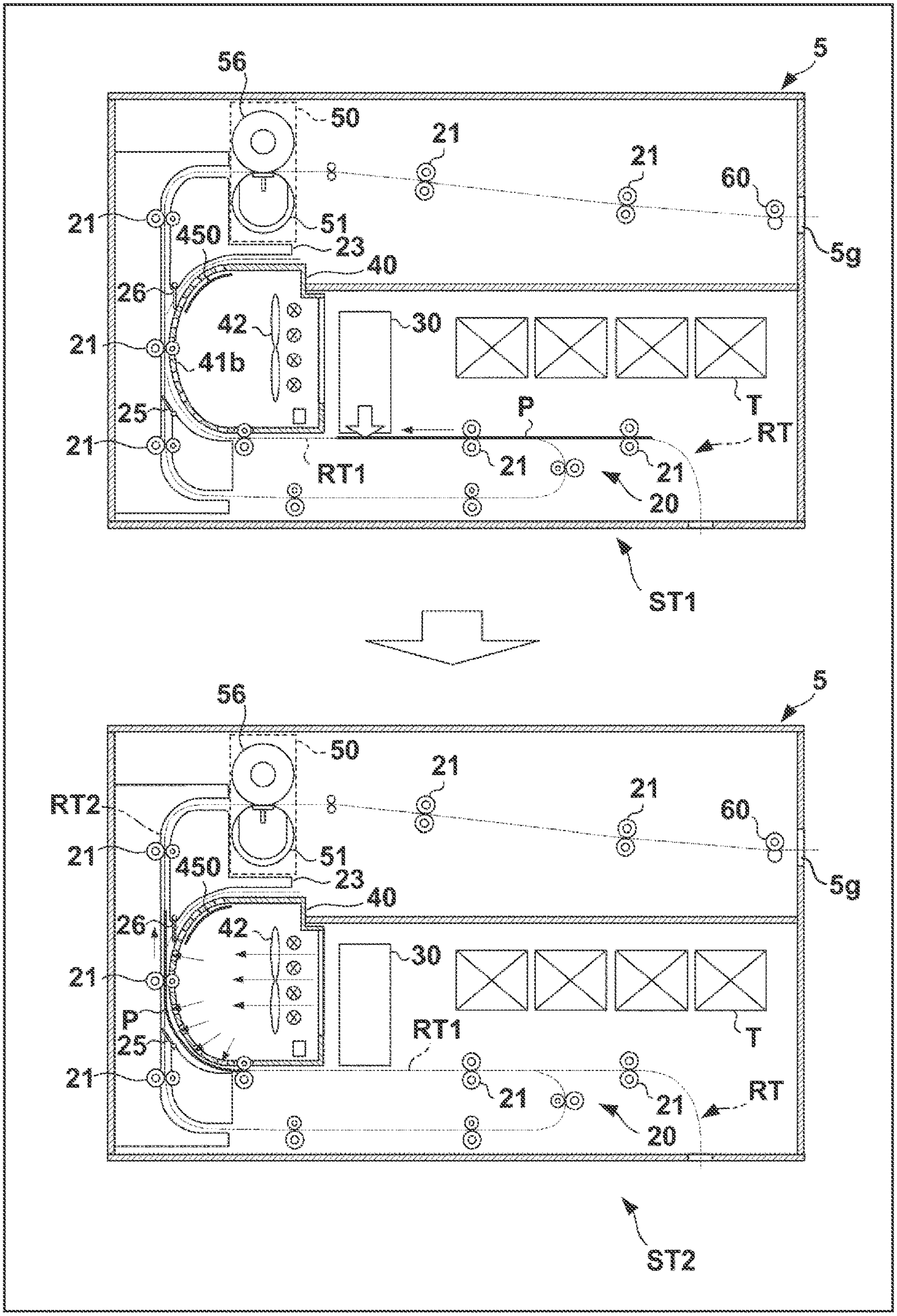
FIG. 6 is an explanatory view for operation of the printing apparatus of FIG. 2.

The state ST1 of FIG. 6 indicates a state in which a sheet P fed from the feeding apparatus 6 is conveyed by the conveyance unit 20 on the main path RT1 to the printing unit 30, and printing by the printing unit 30 is started. The printing unit 30 prints the image by discharging ink to the sheet P as illustrated by the arrow. The sheet P is conveyed towards the drying acceleration unit 40. The drying acceleration unit 40 starts operating, and hot air is blown (state ST2 of FIG. 6) to the sheet P in the heating section R1. Drying of the sheet P which is wet from the ink is accelerated by the hot air.

The sheet P is further conveyed toward the drying acceleration unit 50 on the main path RT2. The drying acceleration unit 50 starts operating, and the sheet P is conveyed by the roller 56 rotating as illustrated in the state ST3 of FIG. 7 and the sheet P is heated by the heating member 51. The drying of the sheet P is further accelerated thereby.

Figure 7:
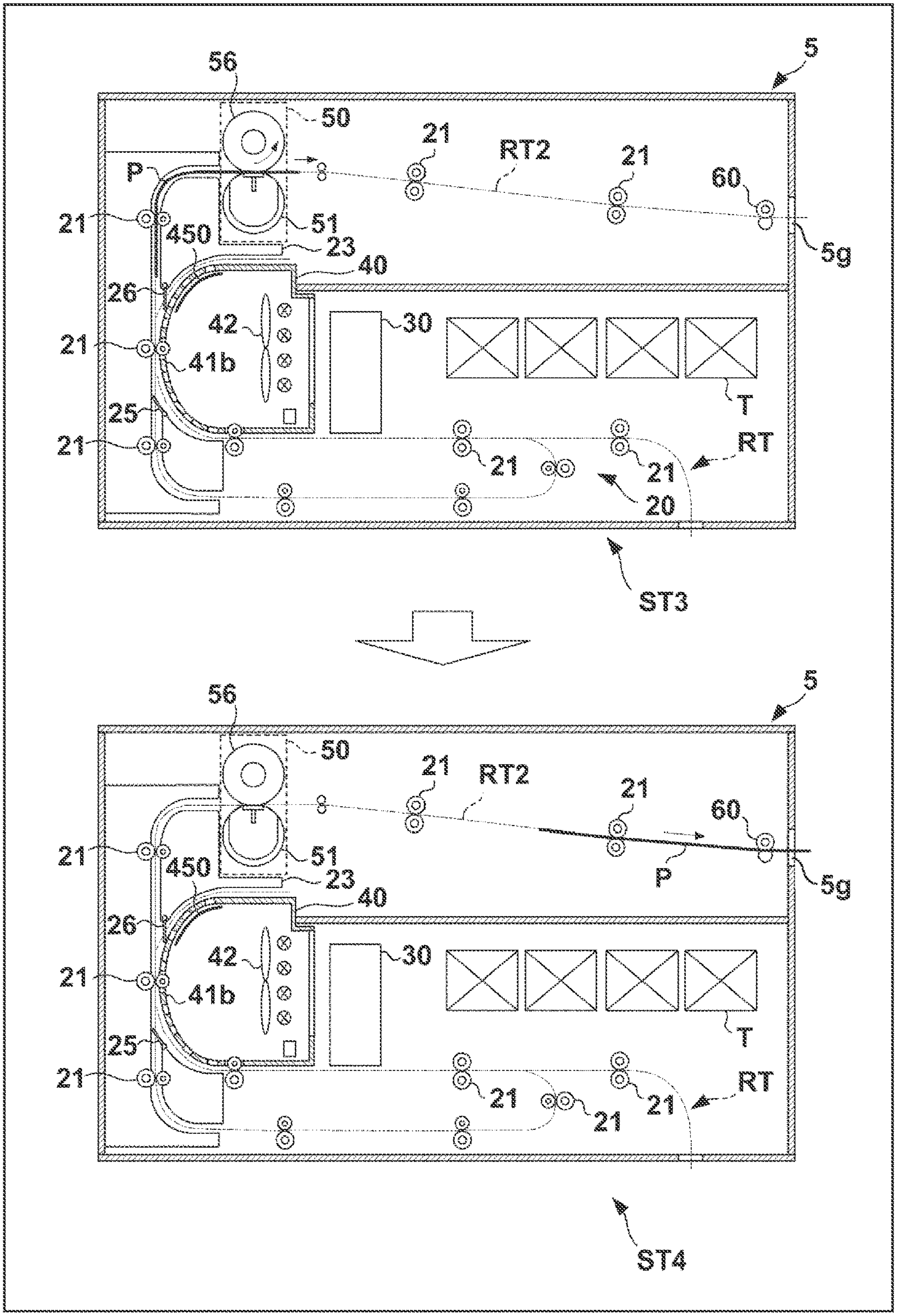
FIG. 7 is an explanatory view for operation of the printing apparatus of FIG. 2.

The sheet P is further conveyed toward the straightening unit 60 on the main path RT2 as illustrated in the state ST4 of FIG. 7. The straightening unit 60 starts operating, a curl in the sheet P is straightened, and the sheet P is discharged to the post-processing apparatus 3 from the opening 5*g*.

Next, with reference to FIG. 8 and FIG. 9, operation in a case where an image is printed on both sides of a sheet will be described. The state ST11 of FIG. 8 indicates a state in which a sheet P fed from the feeding apparatus 6 is conveyed by the conveyance unit 20 on the main path RT1 to the printing unit 30, and printing by the printing unit 30 is started. The printing unit 30 prints the image by discharging ink to a first surface of the sheet P as illustrated by the arrow. The path switching unit 26 is set to the position for the case of double-side printing (the positioning illustrated by dashed lines in FIG. 3A). By the processing of FIG. 10A, the shutter 450 is positioned in the open position and the heating section R2 is set.

The sheet P is conveyed towards the drying acceleration unit 40. The drying acceleration unit 40 starts operating, and hot air is blown (state ST12 of FIG. 8) to the sheet P in the heating section R2. Drying of the sheet P which is wet from the ink is accelerated by the hot air. By the guidance of the path switching unit 26, the sheet P, rather than being conveyed to the drying acceleration unit 50, is conveyed to the redirecting path RT3. Since the heating section R2 is set, hot air is blown onto the sheet P in the redirecting path RT3. When the trailing edge of the sheet P passes the position of the path switching unit 25, the path switching unit 25 is set to the position for double-side printing. Then, the conveyance unit 20 conveys (redirecting conveyance) the sheet P on the redirecting path RT3 in the reverse direction.

Figure 8:
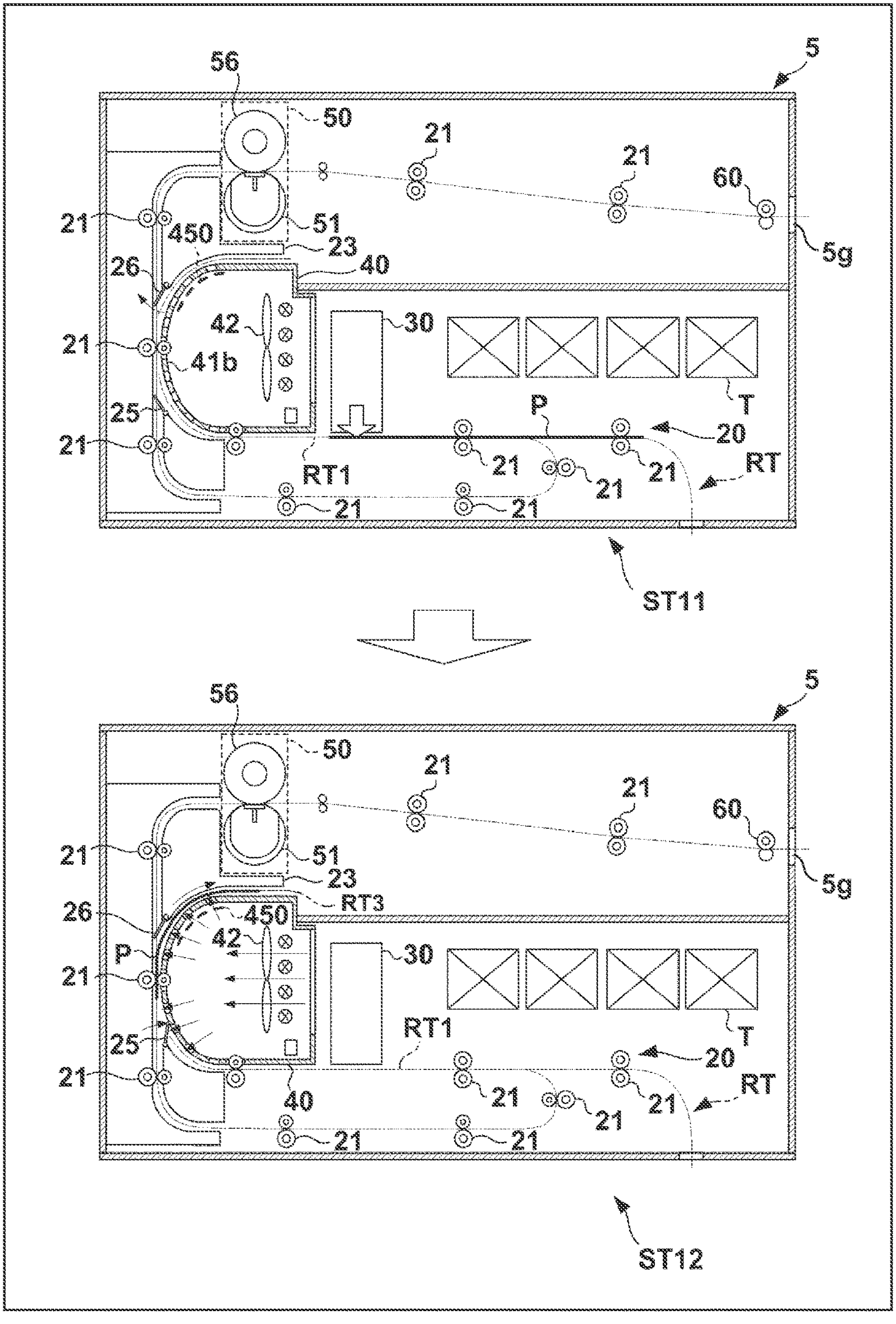
FIG. 8 is an explanatory view for operation of the printing apparatus of FIG. 2.
Figure 9:
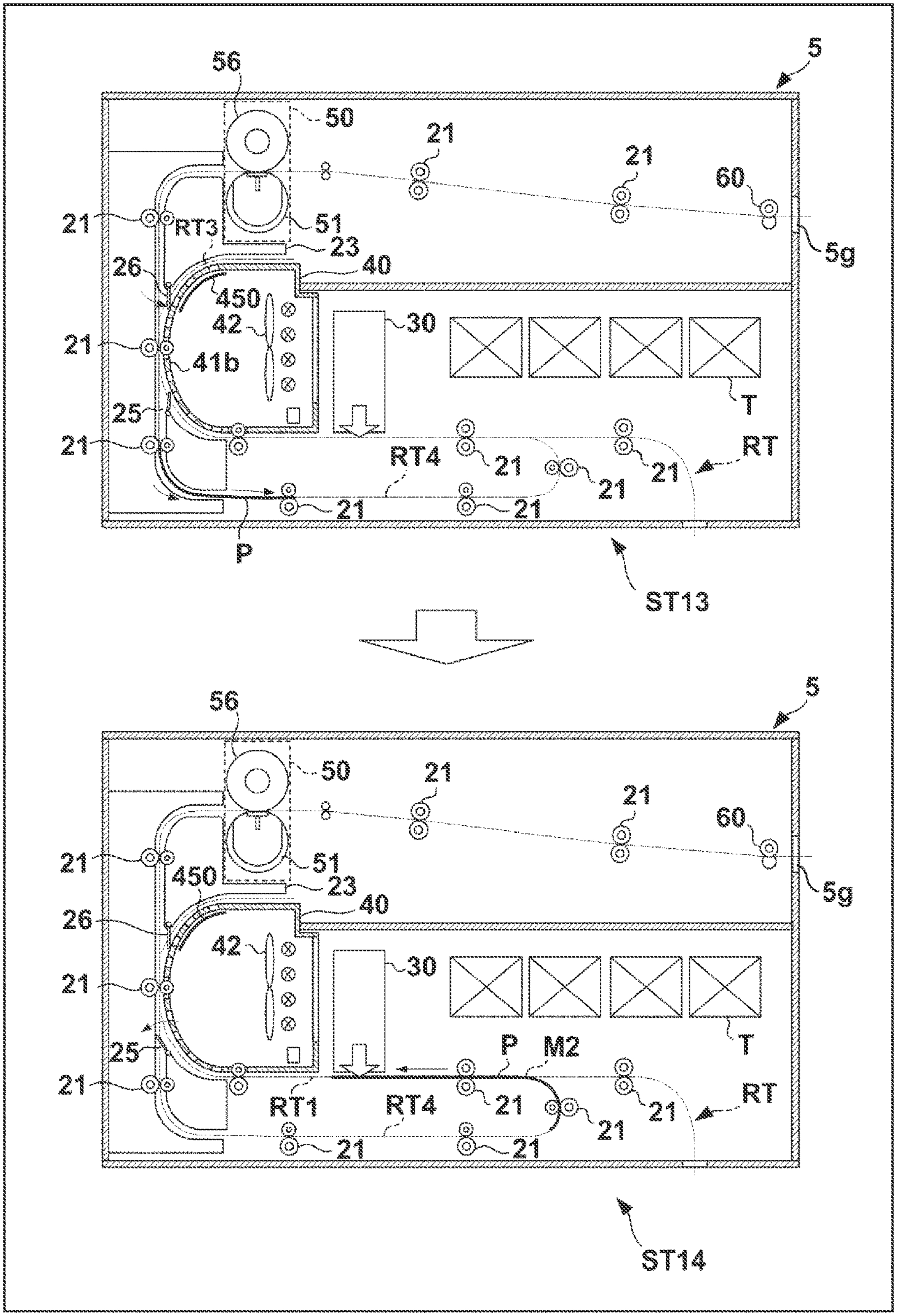
FIG. 9 is an explanatory view for operation of the printing apparatus of FIG. 2.

By guidance of the path switching unit 25, the sheet P is conveyed to the inversion path RT4 as indicated by the state ST13 of FIG. 8. Also, the sheet P is returned to the main path RT1 as illustrated by the state ST14 of FIG. 8. The path switching unit 25 is set to the position (the positioning illustrated by the solid lines in FIG. 3A) in the case of the one-side printing. The printing unit 30 prints the image by discharging ink to a second surface of the sheet P as illustrated by the arrow. The operation after that is the same as in the states ST2 to ST4 of the case of one-side printing.

Regarding the heating and drying in relation to the sheet P, the configuration of the present embodiment is summarized as follows. The drying acceleration unit 50 of the present embodiment is a configuration in which the heating member 51 (the heating element 54) is arranged on one side of the conveyance path RT of the sheet P, and the heating member 51 contacts only one side of the sheet P and heats it. Accordingly, while heat reaches both sides of the sheet P and drying is accelerated, the drying is more accelerated on the one side that the heating member 51 contacts directly. In the case of one-side printing, the heating member 51 contacts the image printing surface of the sheet P.

In the case of double-side printing, the heating element 54 faces the second surface of the sheet P, and the heating member 51 contacts only the back surface, and there is no stage in which the heating member 51 contacts the first surface of the sheet P. Accordingly, in the case of double-side printing, if the other conditions are the same, drying of the sheet P by the drying acceleration unit 50 will be more accelerated for the second surface than the first surface.

Meanwhile, the drying acceleration unit 40 of the present embodiment is arranged on one side of the conveyance path RT of the sheet P, and is a configuration in which hot air is blown only on one side of the sheet P. Accordingly, while drying of both sides is accelerated, the drying on the one side that the hot air directly hits is more accelerated. In the case of one-side printing, the hot air is blown on the image printing surface of the sheet P in the heating section R1.

In the case of the double-side printing, in the stage in which an image is printed on the first surface of the sheet P, hot air is blown on the first surface in the heating section R2, and in the stage in which an image is printed on the second surface, hot air is blown on the second surface in the heating section R1.

Regarding the drying in both the drying acceleration units 40 and 50 in the case of double-side printing, in the drying by the drying acceleration unit 40, drying of the first surface of the sheet P is accelerated more than the second surface by using the length of the heating section. In the drying by the drying acceleration unit 50, the drying of the second surface of the sheet P is accelerated more than the first surface at the point of the contact surface. Accordingly, it is possible to reduce the difference in drying between the front/back surfaces.

Second Embodiment

In the first embodiment, the difference (conveyance path difference) between one-side printing and double-side printing is given as an example of the print condition upon which the heating section change is based, but the print condition is not limited thereto. For example, the heating section may change depending on the discharge amount of ink onto the sheet P. Specifically, in a case where the ink discharge amount is large and the drying capability should be increased, a longer heating section may be selected, and in the case where the ink discharge amount is smaller, a shorter heating section may be selected. In the example of FIG. 10A, in the case where it is determined that it is not the stage in which an image is printed on the second surface of the sheet in step S3, the processing does not advance to the step S4 immediately, and further determines whether the ink discharge amount corresponding to the first surface is equal to a threshold or more. If the ink discharge amount is equal to the threshold or more, the processing advances to step S4, and if it is less than the threshold, the processing advances to step S2.

Third Embodiment

In the first embodiment, the driving condition for the fan 42 and the heating element 43 of the hot air drying unit 40 is not changed even in a case where both the heating sections R1 and R2 have been set, but configuration may be taken to change it. If the driving condition is the same for these, the drying capability per unit area of sheet may be increased for when the heating section R1 is set. Accordingly, in the case where the heating section R1 is set, output of at least one of the fan 42 and the heating element 43 may be reduced. It is possible to achieve a reduction in power consumption thereby.

Fourth Embodiment

Figure 10B:
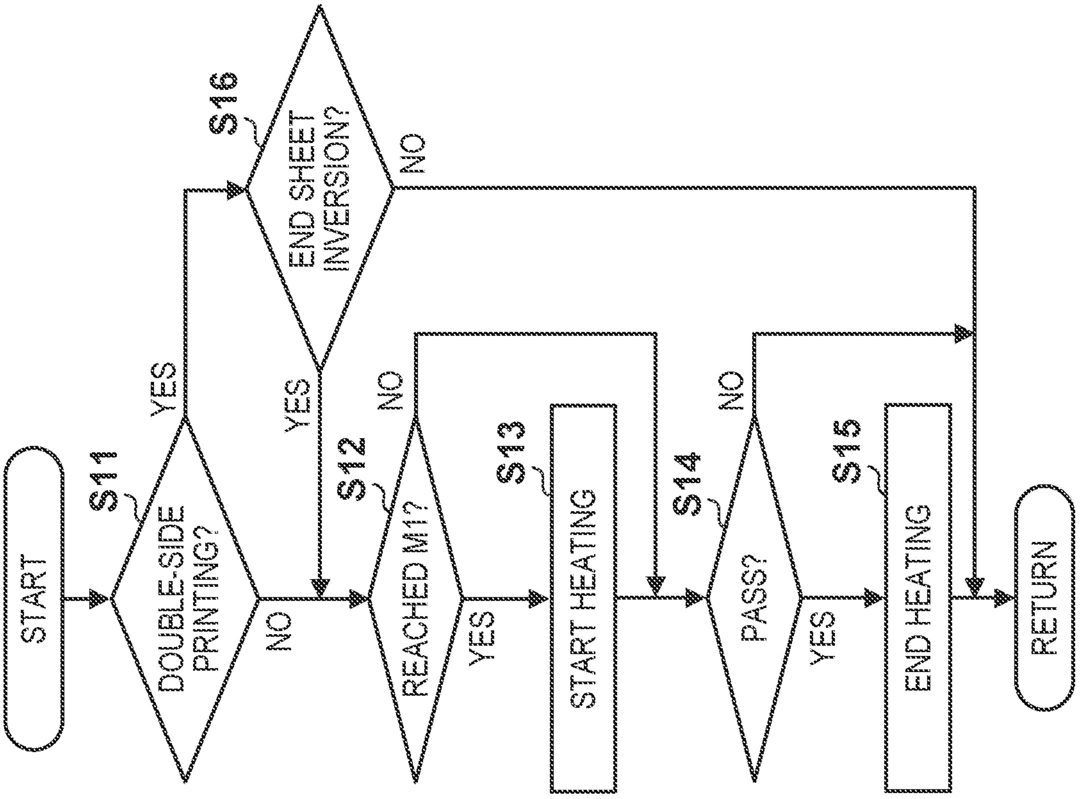

Configuration may be taken so as not to continuously heat the heating element 54 of the drying acceleration unit 50, and to stop the heating in the time period in which heat-drying of the sheet P is not performed by the drying acceleration unit 50. FIG. 10B is a flowchart that illustrates an example of control for driving the heating element 54, and processing in FIG. 10B is executed by the drying control unit 17, for example. To outline the details of the control, the heating element 54 starts heating the sheet when it reaches the midpoint M1, and when the sheet passes the drying acceleration unit 50, the heating is stopped. However, in the case of double-side printing, even after the sheet reaches the midpoint M1 immediately after the image is printed on the first surface, the heating is not started; the heating is started when the sheet reaches the midpoint M1 after the image is printed on the second surface. Until the sheet reaches the drying acceleration unit 50, there is a period in which the heating of the heating element 54 is stopped, and therefore it is possible to reduce the power consumption and to prevent a rise in the internal temperature of the apparatus.

In step S11, it is determined whether a print condition for an image on a sheet that is the current print target is one-side printing or double-side printing. In the case of one-side printing, the processing advances to step S12, and in the case of double-side printing, the processing advances to step S16. In step S12, it is determined whether the sheet reached the midpoint M1. This determination is performed based on the result of detection by the sheet sensor described above. In the case where it is determined that the sheet has reached the midpoint M1, the processing advances to step S13, and in a case where it is determined not to have been reached, or when it had already been reached, the processing advances to step S14.

In step S13, the heating element 54 is driven and the heating is thereby started. In step S14, it is determined whether a sheet has passed the drying acceleration unit 50. This determination is performed based on the above-described sheet sensor detection results. In the case where the sheet is determined to have passed the drying acceleration unit 50, the processing advances to step S15, and in the case where it is determined to not have passed yet, the processing ends. In step S15, driving of the heating element 54 driven in step S14 is stopped, and the heating is ended.

In step S16, printing of the image on the first surface of the sheet in the double-side printing ends and it is determined that whether the inversion of the sheet has ended (whether the sheet has passed the inversion path RT4). This determination is performed based on the result of detection by the sheet sensor described above. In the case where the inversion of the sheet has ended, the processing advances to step S12, and in the case where it has not ended, the processing ends. By this, in the case of double-side printing, an image is printed on the second surface of the sheet, and the heating of the heating element 54 is stopped until the midpoint M1 is reached.

Fifth Embodiment

Figure 11:
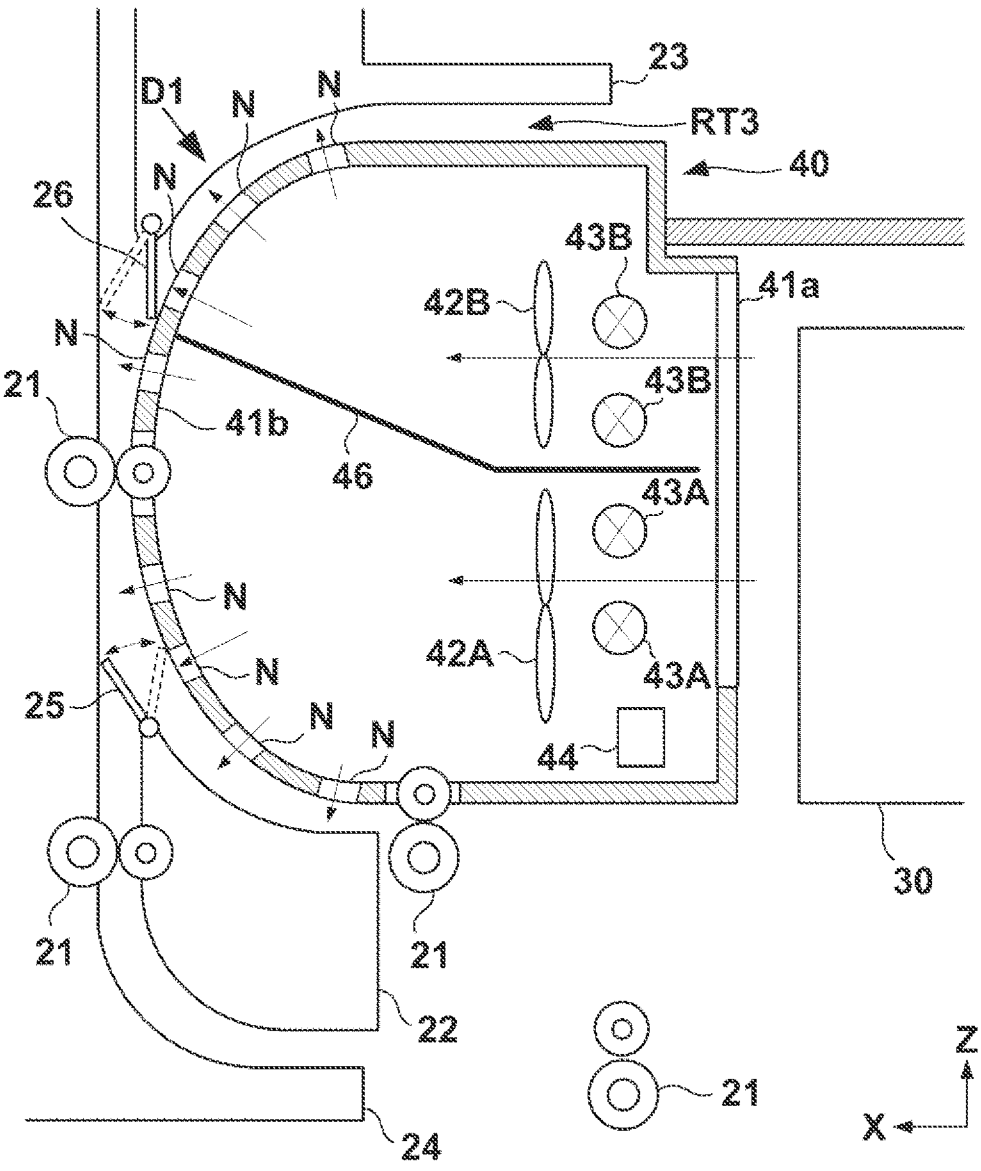
FIG. 11 is the explanatory view of a drying acceleration unit of another example.

In the first embodiment, the shutter unit 45 was used to change the heating section, but other methods may be be used. FIG. 11 illustrates an example of another configuration of the drying acceleration unit 40. In the drying acceleration unit 40 of the figure, a partition wall 46 which separates the internal space of the hollow body 41 vertically is provided. As configurations corresponding to the fan 42 and the heating element 43 of the first embodiment, fans 42A and 42B which are driven independently and heating elements 43A and 43B are provided. The fan 42A and the heating element 43A are arranged in the lower space in the internal space of the hollow body 41 separated by the partition wall 46, and the fan 42B and the heating element 43B are arranged in the upper space separated by the partition wall 46.

When the heating section R1 is set, the fan 42A and the heating element 43A are driving driven when drying the sheet, and the fan 42B and the heating element 43B are not driven. When the heating section R2 is set, the fan 42A and the heating element 43A are driven when drying the sheet, and the fan 42B and the heating element 43B are driven.

Figure 12:
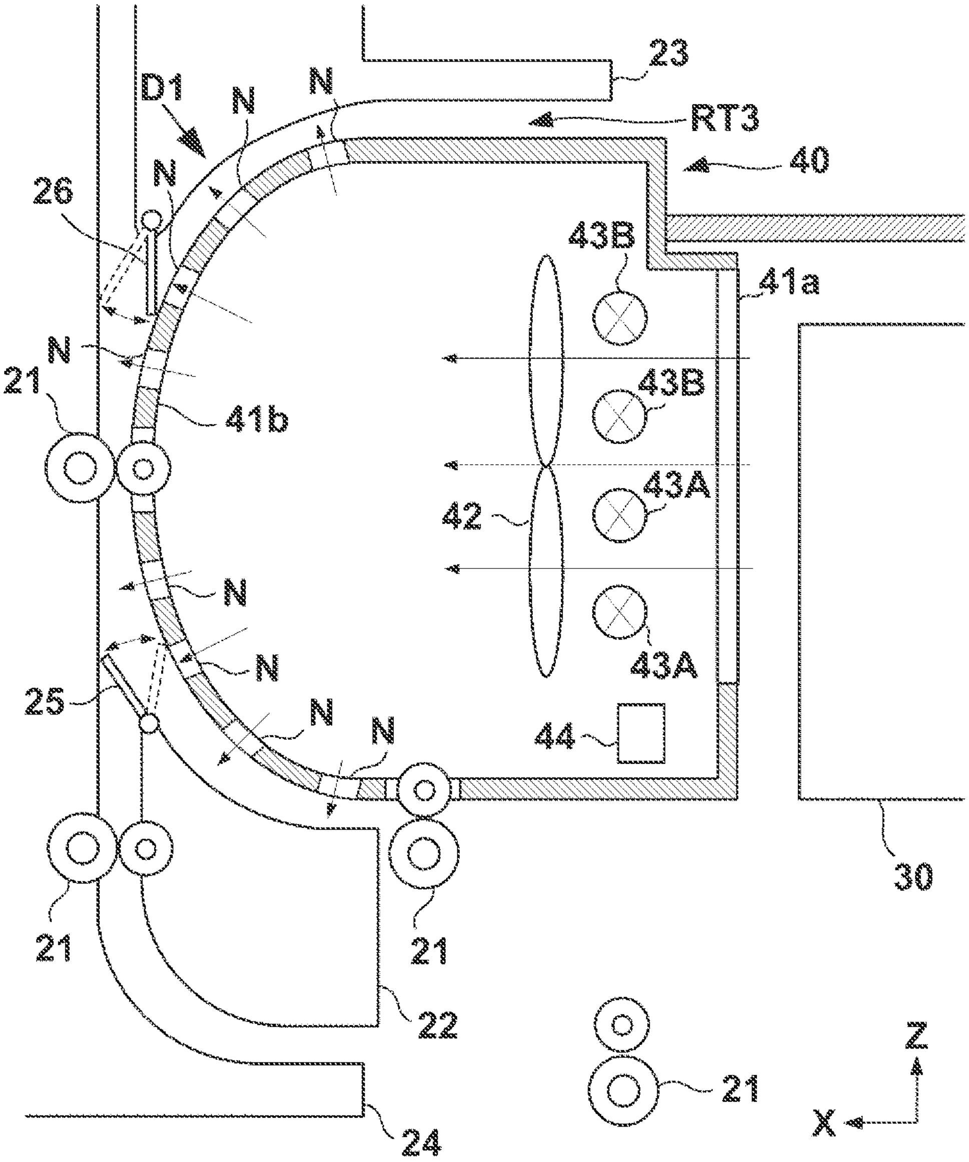
FIG. 12 is the explanatory view of a drying acceleration unit of another example.

FIG. 12 illustrates an example of yet another configuration of the drying acceleration unit 40. The drying acceleration unit 40 of the figure is a configuration that corresponds to the heating element 43 of the first embodiment, and heating elements 43A and 43B which are driven independently are provided. The heating element 43A is arranged in the lower space of the internal space of the hollow body 41, and the heating element 43B is arranged in the upper space. The partition wall 46 illustrated in FIG. 11 is not arranged, and the fan 42 is not separated into upper and lower spaces. By driving the fan 42, the air flow generated in the internal space of the hollow body 41 becomes a crosscurrent, but it is possible to produce a temperature difference within the space in accordance with which of the heating elements 43A and 43B are driven. If the configuration is such that the air flow generated in the internal space of the hollow body 41 by driving the fan 42 becomes closer to a laminar flow, it is possible to more clearly produce this temperature difference.

When the heating section R1 is set, the fan 42 and the heating element 43A are driven when drying the sheet, and the heating element 43B is not driven. The hot air is sent from each outlet N and is blown to the redirecting path RT3 as well, but since the heating element 43B is not driven, the temperature of the hot air sent to the redirecting path RT3 is comparably lower. Since the heating element 43B is not driven, it is possible to prevent unnecessary power consumption and a rise in the internal temperature of the apparatus.

When the heating section R2 is set, the fan 42 and the heating elements 43A and 43B are driven when drying the sheet. Since the heating element 43B is driven, hot air whose temperature does not differ from other sections is sent to the redirecting path RT3.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154973, filed Aug. 27, 2019, which is hereby incorporated by reference herein in its entirety.

What is claimed is:

1. A printing apparatus, comprising:

a conveyance unit configured to convey a medium along a conveyance path in a conveyance direction, the conveyance path including an inversion path configured to invert a first surface and a second surface of the medium;

a printing unit configured to discharge ink onto the first surface of the medium conveyed without passing through the inversion path, and to discharge ink onto the second surface of the medium conveyed through the inversion path; and a heating unit configured to:

heat the medium at a first region; and heat the medium at a second region on a downstream side of the first region with respect to the conveyance direction, wherein heating by the heating unit at least at a part of the second region is not performed in a case in which the heating unit heats the medium at the first region.

2. The printing apparatus according to claim 1, wherein the heating unit is configured to blow hot air from a plurality of outlets, and of the plurality of outlets for heating the medium, outlets in the first region are at least partially different from outlets in the second region.

3. The printing apparatus according to claim 1, further comprising a second heating unit disposed at a location different from a location of the heating unit with respect to the conveyance direction.

4. The printing apparatus according to claim 1, wherein the heating unit is configured to blow hot air from a plurality of outlets to the first surface of the medium conveyed without passing through the inversion path, and to blow hot air from the plurality of outlets to the second surface of the medium conveyed through the inversion path.

5. The printing apparatus according to claim 1, wherein the medium is a sheet.

6. A method of controlling a printing apparatus including a conveyance unit configured to convey a medium along a conveyance path in a conveyance direction, the conveyance path including an inversion path configured to invert a first surface and a second surface of the medium, a printing unit configured to discharge ink onto the first surface of the medium conveyed without passing through the inversion path, and a heating unit configured to heat the medium, the method comprising:

heating the medium at a first region with the heating unit; and heating the medium at a second region with the heating unit on a downstream side of the first region with respect to the conveyance direction, wherein heating by the heating unit at least at a part of the second region is not performed in a case in which the heating unit heats the medium at the first region.

7. The method according to claim 6, wherein the heating unit is configured to blow hot air from a plurality of outlets, and of the plurality of outlets for heating the medium, outlets in the first region are at least partially different from outlets in the second region.

8. The method according to claim 6, wherein the printing apparatus includes a second heating unit disposed at a location different from a location of the heating unit with respect to the conveyance direction.

9. The method according to claim 6, wherein the heating unit is configured to blow hot air from a plurality of outlets to the first surface of the medium conveyed without passing through the inversion path, and to blow hot air from the plurality of outlets to the second surface of the medium conveyed through the inversion path.

10. The method according to claim 6, wherein the medium is a sheet.

* * * * *